Figure 6:
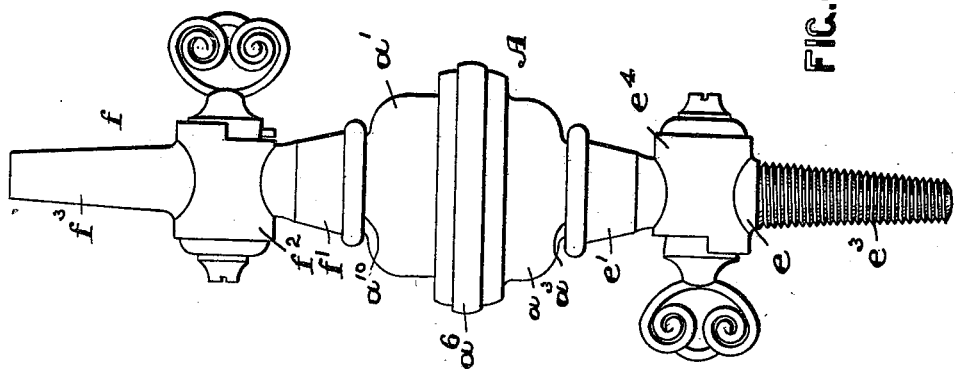

No. 666,844. Patented Jan. 29, 1901.
F. C. BURGHOLZ.
STERILIZING DEVICE.
(Application filed Mar. 12, 1900.)
(No Model.) 2 Sheets—Sheet 1.
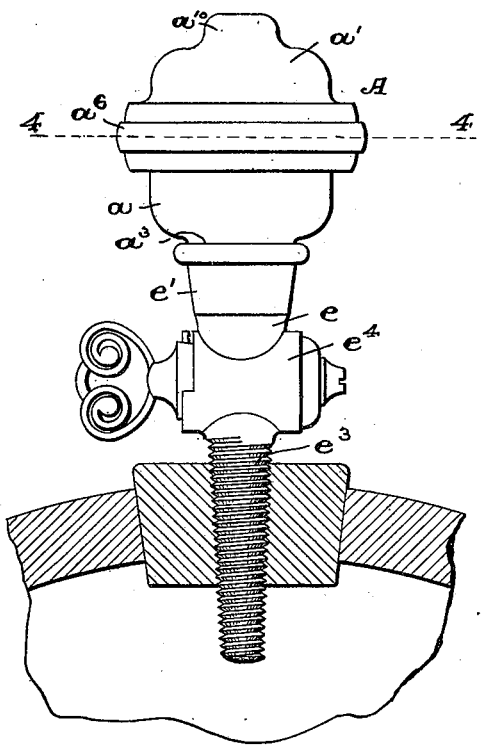
FIG. 1
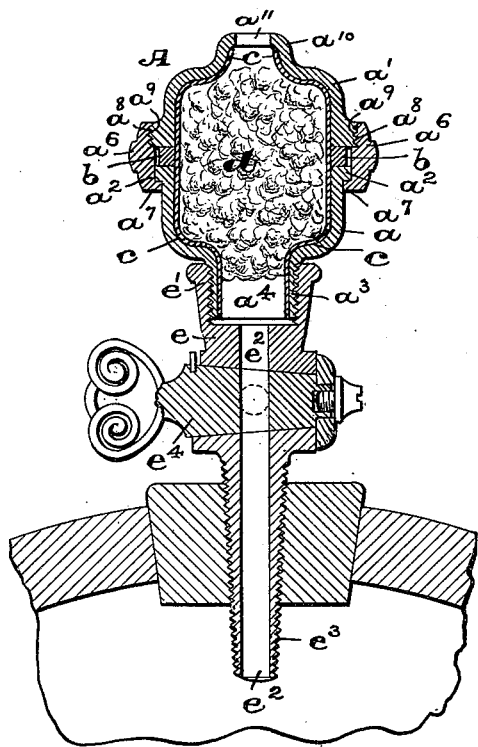
FIG. 2
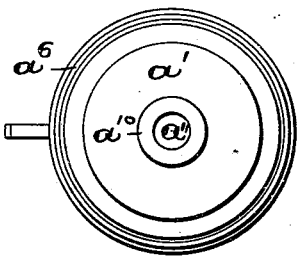
FIG. 3
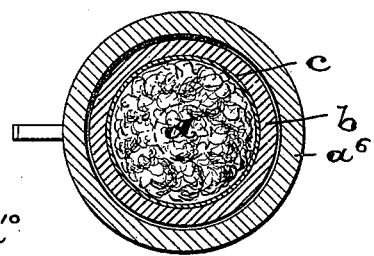
FIG. 4
FIG. 5
WITNESSES:
Geo. D. Richards
Marcey J. Trusdell
INVENTOR:
FRANK C. BURGHOLZ
BY
Fred C. Fraentzel,
ATTORNEY
THE NORRIS PETERS CO., PHOTO-LITHO., WASHINGTON, D. C.

No. 666,844. Patented Jan. 29, 1901.
F. C. BURGHOLZ.
STERILIZING DEVICE.
(Application filed Mar. 12, 1900.)
(No Model.) 2 Sheets—Sheet 2.

WITNESSES:
Geo. D. Richards
Marcy Z. Trusdell

INVENTOR:
FRANK C. BURGHOLZ
BY
Fred C. Fraentzel,
ATTORNEY

UNITED STATES PATENT OFFICE.

FRANK C. BURGHOLZ, OF HARRISON, NEW JERSEY.

STERILIZING DEVICE.

SPECIFICATION forming part of Letters Patent No. 666,844, dated January 29, 1901.

Application filed March 12, 1900. Serial No. 8,317. (No model.)

*To all whom it may concern:*

Be it known that I, FRANK C. BURGHOLZ, a citizen of the United States, residing at Harrison, in the county of Hudson and State of New Jersey, have invented certain new and useful Improvements in Sterilizing Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in devices for the venting of barrels, casks, and other packages containing wines, beer, and other liquors.

My present invention has for its primary object to provide a novel construction of sterilizing device for the venting of barrels, casks, and the like by means of which beer, ales, water, wines, and, in fact, any liquid in general use as nourishment or tonic may be preserved for a long time and may be drawn from the barrel or cask in small quantities and from time to time as required without deterioration of the contents by the admission of sterilized or purified air passed through the venting and sterilizing device which forms the embodiment of my invention.

It is a well-known fact that a full cask or barrel of wine, cider, or other fermenting liquor may be preserved for years as long as the cask or barrel remains tightly closed; but as soon as the liquid is withdrawn in small quantities it has been found that the air which is admitted into the cask or barrel will soon deteriorate the contents. I have found, however, that sterilized or pure air can safely be admitted into the barrel or cask without injurious effects to the contents, which enables the drawing off of the liquid in small quantities from time to time as may be required. I have also found that by applying to the barrel or cask an air sterilizing or purifying device constructed in the manner of a vent, to purify the air while it is being admitted into the barrel or cask, water for drinking or other purposes on board ship, &c., can be kept in barrels or casks in a pure state and in good condition for a very long time. Furthermore, by applying a vent made according to my invention to a package containing milk the latter can be kept sweet and pure during shipment and during thunderstorms.

My invention therefore consists in the novel sterilizing-vent hereinafter set forth and also in the novel arrangements and combinations of the several parts thereof, as well as in the details of the construction of such parts, all of which will be more fully described in the accompanying specification and then finally embodied in the clauses of the claim thereof.

The invention is clearly illustrated in the accompanying drawings, in which—

Figure 7:
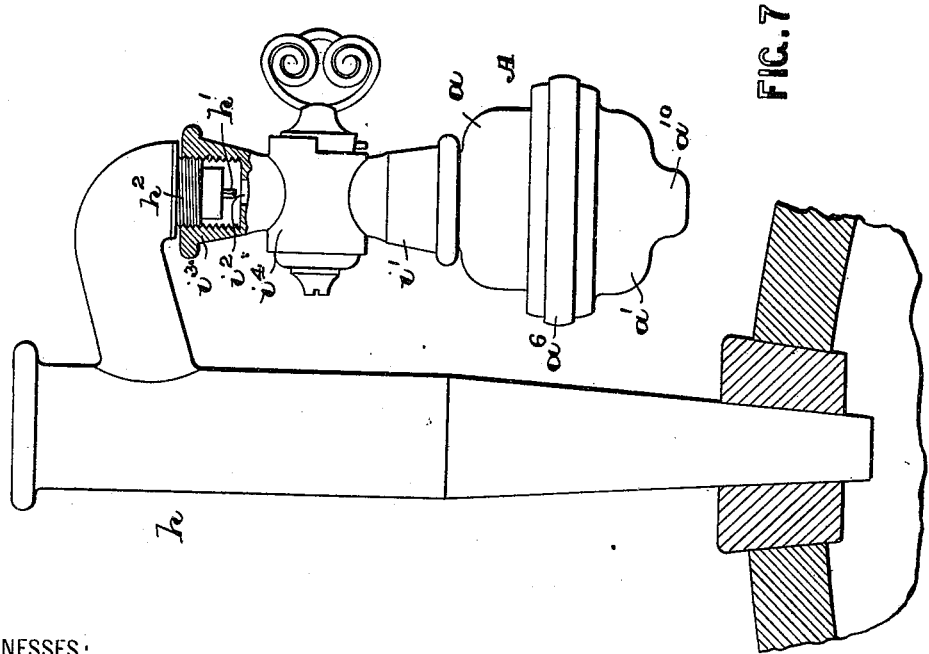

Figure 1 is a side view of my novel construction of sterilizing device screwed in position in the bung of a barrel, said bung and barrel portion being represented in section. Fig. 2 is a vertical section of the sterilizing device. Fig. 3 is a top or plan view of the same, and Fig. 4 is a horizontal section taken on line 4 4 in said Fig. 1. Fig. 5 is a sectional view of a chambered body or main portion of the sterilizing-vent similar to that represented in Fig. 2, but illustrating in addition thereto the use of a piece of wire-gauze or similar supporting means for retaining the sterilizing material or agent in proper position in said device. Fig. 6 is a side view of a venting device similar to that represented in said Figs. 1 to 5, inclusive, but showing the same provided with a pair of stop-cocks on opposite ends of the main body portion of the device; and Fig. 7 is a side view of a sterilizing device made according to my invention, illustrating its application to a vent, such as is used in connection with barrels or casks containing beer or ales, into which the vent is driven by means of a hammer and held therein by frictional engagement instead of being screwed in position, as in the construction represented in the other figures of the drawings.

Similar letters of reference are employed in all of the said above-described views to indicate corresponding parts.

The device shown in the said drawings consists, essentially, of a main portion or body A, comprising a lower receiving portion $a$ and an upper receiving portion $a'$. The said portion $a$, as will be seen from Figs. 2 and 5, is provided with an annular flange $a^2$ and has at its lower end a screw-threaded neck $a^3$, formed with an opening or outlet $a^4$. The said annular flange $a^2$ of said lower portion $a$ rests upon an inwardly-extending shoulder $a^7$ of a ring $a^6$, provided with an internal screw $a^8$, which receives a correspondingly-arranged screw portion $a^9$ on the upper receiving portion $a'$ of the main body, as clearly illustrated. The upper part of this receiving portion $a'$ is provided with a suitable neck $a^{10}$, in which there is an opening or inlet $a^{11}$. These two portions $a$ and $a'$ are suitably secured in position in the said ring $a^6$, with a suitable rubber gasket or other packing-ring $b$ arranged between the two oppositely-placed edges of the respective receiving portions $a$ and $a'$. When these parts have thus been secured together, a chamber is provided, which is preferably coated or lined with a coating of wax or paraffin, as $c$, or other material which is impervious to air, whereby the main or body portion A by such arrangement of the coating $c$ and the packing $b$ is entirely free from any admission of air through the joints of the connected parts $a$, $a'$, and $a^6$, and the air can only be admitted at the opening or inlet $a^{11}$, and then passes through the sterilizing material or agent, such as cotton, (indicated by the reference-letter $d$,) in the chamber formed in the main portion of body A, where the air is purified and finally escapes from the outlet $a^4$ into a tubular fixture $e$ and into the cask or barrel with which the device is connected. This fixture $e$ is preferably made in the manner of a faucet and has a screw-threaded socket or receiving portion $e'$, into which the screw-threaded neck $a^3$ is screwed, and whereby communication is established for the passage of the air from the outlet or opening $a^4$ in said neck into the duct $e^2$ of the fixture $e$, and thence into the barrel or cask, as will be clearly evident from an inspection of Fig. 2.

The lower portion of the fixture $e$ is preferably made with a screw-threaded end $e^3$, whereby it can be screwed into the bung or into any other part of a barrel or cask in the usual and well-known manner, the threads of the screw portion $e^3$ of the fixture securely holding the sterilizing-vent in position against any pressure from within the cask or barrel. The said fixture $e$ is also preferably provided with a stop-cock or valve portion $e^4$, by means of which the duct or passageway $e^2$ through the fixture can be closed when it is desired to shut off the supply of air from the device A into the barrel or cask or other package with which the sterilizing vent or device is employed.

In some cases, if found desirable, I may arrange in the receiving portion $a$ of the main body A a wire-gauze $g$ or other suitably-constructed supporting means which retains the sterilizing-cotton $d$ or other sterilizing agent in place in the chambered parts of said main body A and prevents it from being forced down into the opening or outlet $a^4$ in the neck $a^3$, said supporting means $g$ being of such construction that it will not interfere with the flow of the sterilized air from said main body A into the fixture $e$ and through the latter into the barrel or cask with which the vent is connected.

In Fig. 6 I have represented the main portion or body A of the venting device provided directly above the inlet $a^{11}$ with an air-receiving fixture $f$, which is provided with a socket $f'$ for suitably connecting said fixture with the neck $a^{10}$. The said fixture $f$ is made tubular in the manner of the fixture $e$ and is preferably provided with a stop-cock $f^2$ and a nozzle portion $f^3$ for receiving a piece of tubing or other conveying means through which air is to be forced into the sterilizing-chamber of the device, as will be clearly evident.

When my novel construction of sterilizing-vent is to be used with the ordinary construction of vent $h$ (see Fig. 7) for barrels or casks containing beer or ales, which vent is driven into the bung by means of a mallet or hammer, I provide the air-inlet or valve portion $h'$ of said vent $h$ with a screw-thread $h^2$, as clearly illustrated. In this case the positions of the parts forming the main body A of my sterilizing-vent are reversed, and upon the screw-threaded neck $a^3$ of the part $a$ I have secured the socketed portion $i'$ of a fixture $i$. This fixture $i$ has a central duct or passageway $i^2$ in communication with the sterilizing-chamber of the main body A. The upper part of this fixture $i$ is provided with a screw-threaded socket $i^3$ for securing the fixture upon the screw-thread $h^2$ of the vent $h$. Said fixture $i$ may also be provided with a suitable stop-cock $i^4$ for opening and closing the duct $i^2$ in the fixture. From an inspection of said Fig. 7 it will be seen that the vent $h$ can be driven in position upon the barrel or cask in the usual manner without any danger of destroying the usefulness of the sterilizing device connected therewith, and whenever the spigot of the barrel is opened for the drawing off of some of the liquor the valve in the vent $h$ is actuated in the usual and well-known manner, and a supply of sterilized and purified air is drawn from the sterilizing-chamber of the body A into and through the vent $h$ and into the barrel or cask, as will be clearly evident.

From the above description of my invention it will be clearly understood that I have devised a simple and operative attachment or vent for casks, barrels, and other packages containing wines, beer, ales, water, or other liquids for first sterilizing or purifying the air as it passes through the venting device and whereby the liquid can be withdrawn from the barrel or cask in quantities as required without any deterioration of the liquid remaining in the barrel or cask by the commingling therewith of any impure air, as heretofore, and thereby preserving the liquid in the tapped barrel or cask for a long time and until the barrel or cask has been emptied of its contents.

I am fully aware that many changes may be made in the several arrangements and combinations of the parts as well as in the details of the construction thereof without departing from the scope of my invention. Hence I do not limit my invention to the exact arrangements and combinations of the parts, as herein described and as illustrated in the accompanying drawings, nor do I confine myself to the exact details of the construction of such parts.

Having thus described my invention, what I claim is—

1. In a vent for casks, barrels, or the like, the combination, with the tubular body of said vent, a valve in said body, and a receiving-socket, of a sterilizing device detachably arranged in said socket, consisting of a chambered main body, means connected with said body for securing it in position in said receiving-socket, a means of induction and eduction into and from said body for the passage therethrough of a fluid or air to be sterilized, a sterilizing material or agent in said chambered body, a means of support in said chambered body above the outlet therein for retaining said sterilizing material or agent in position, and a coating of paraffin between the inner walls of said chambered body and the sterilizing material or agent therein, substantially as and for the purposes set forth.

2. The herein-described sterilizing device for barrels, casks, or the like, comprising a chambered main body A, consisting of a pair of receiving portions or shells $a$ and $a'$, said shell $a'$ having an inlet and said shell $a$ an outlet, a tubular fixture $e$, a socket $e'$ connected therewith in which said shell $a$ is removably arranged, having a direct means of communication with the outlet from said shell $a$, and a sterilizing material or agent in said chambered body A, substantially as and for the purposes set forth.

3. The herein-described sterilizing device for barrels, casks, or the like, comprising a chambered main body A, consisting of a pair of receiving portions or shells $a$ and $a'$, said shell $a'$ having an inlet and said shell $a$ an outlet, a tubular fixture $e$, a socket $e'$ connected therewith in which said shell $a$ is removably arranged, having a direct means of communication with the outlet from said shell $a$, a sterilizing material or agent in said chambered body A, and a coating of paraffin between the inner walls of said chambered body and the sterilizing material or agent therein, substantially as and for the purposes set forth.

4. The herein-described sterilizing device for barrels, casks, or the like, comprising a chambered main body A, consisting of a pair of receiving portions or shells $a$ and $a'$, said shell $a'$ having an inlet and said shell $a$ an outlet, a tubular fixture $e$, a socket $e'$ connected therewith in which said shell $a$ is removably arranged, having a direct means of communication with the outlet from said shell $a$, a sterilizing material or agent in said chambered body A, and a means of support in said chambered body above the outlet therein, for retaining the sterilizing material or agent in position, substantially as and for the purposes set forth.

5. The herein-described sterilizing device for barrels, casks, or the like, comprising a chambered main body A, consisting of a pair of receiving portions or shells $a$ and $a'$, said shell $a'$ having an inlet and said shell $a$ having an outlet, a tubular fixture $e$, a socket $e'$ connected therewith in which said shell $a$ is removably arranged, having a direct means of communication with the outlet from said shell $a$, a sterilizing material or agent in said chambered body A, a means of support in said chambered body above the outlet therein for retaining the sterilizing material or agent in position, and a coating of paraffin between the inner walls of said chambered body and the sterilizing material, substantially as and for the purposes set forth.

In testimony that I claim the invention set forth above I have hereunto set my hand this 6th day of March, 1900.

FRANK C. BURGHOLZ.

Witnesses:
FREDK. C. FRAENTZEL,
GEO. D. RICHARDS.